March 10, 1942.    O. R. CARPENTER    2,275,419
METHOD OF WELDING
Filed March 15, 1938    2 Sheets-Sheet 1
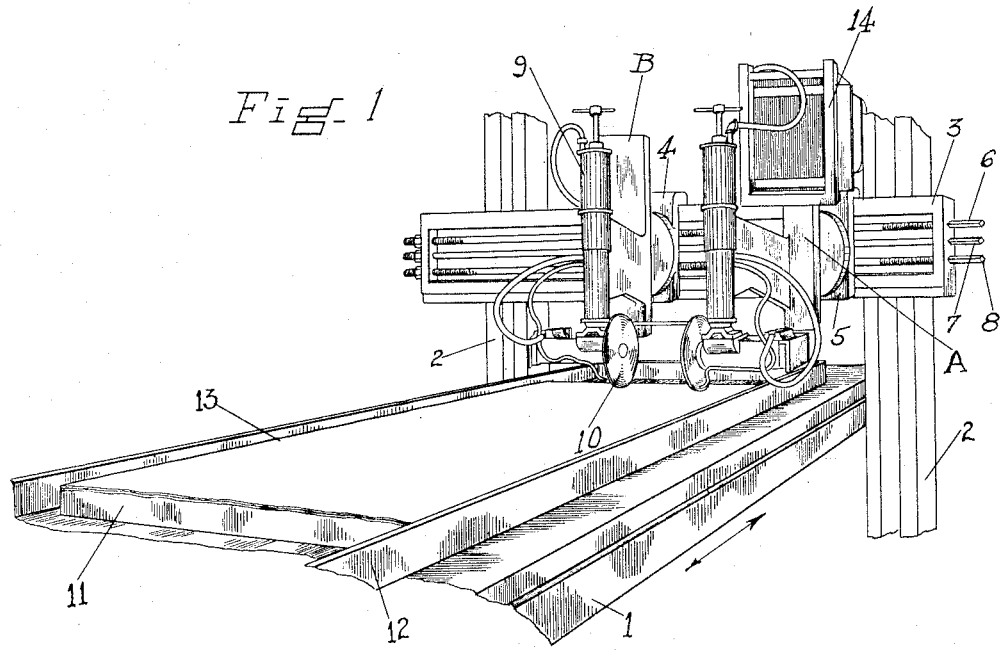
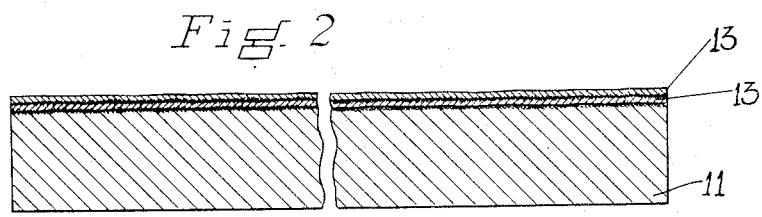
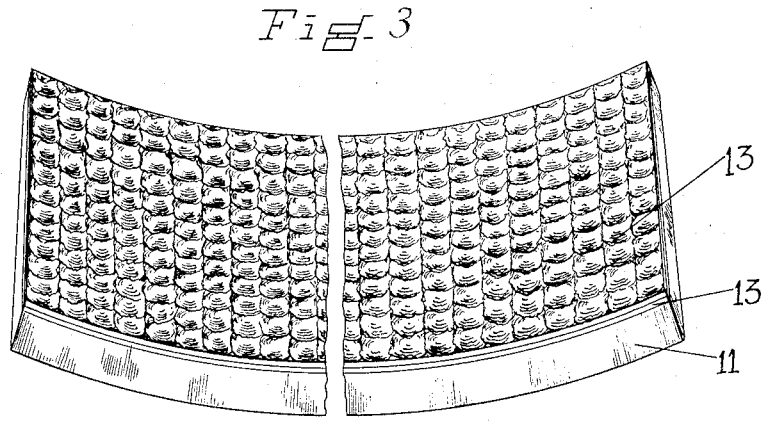
INVENTOR.
Otis R. Carpenter
BY
ATTORNEY.

March 10, 1942. O. R. CARPENTER 2,275,419
METHOD OF WELDING
Filed March 15, 1938   2 Sheets-Sheet 2

INVENTOR.
Otis R. Carpenter
BY
ATTORNEY.

Patented Mar. 10, 1942

2,275,419

UNITED STATES PATENT OFFICE 2,275,419

METHOD OF WELDING

Otis Richard Carpenter, Barberton, Ohio, assignor to The Babcock & Wilcox Company, Newark, N. J., a corporation of New Jersey Application March 15, 1938, Serial No. 195,975

8 Claims. (Cl. 219—10)

This invention relates to welding.

High temperatures and pressures at present used in processing oils and other chemicals confront the manufacturers of pressure vessels with problems of stress and corrosion which, from the economic standpoint, are best solved by multi-metallic plates the main body of which consists of a relatively cheap and thick metal base capable of withstanding the pressure, and a corrosion resistant veneering layer or liner of alloy adapted to withstand the service to which it is to be subjected.

Clad plate of the above indicated character has, for some time, been used in the fabrication of pressure vessels and other structures; and such plate as is common to present practice includes that wherein the alloy cladding or veneering sheet is bonded to the base metal plate by rolling and forging at welding temperatures; this type of plate has the advantage that flow of heat or thermal drainage out of the lining is radial at all locations where an adequate bond is secured but, unfortunately, with this method of forming the multi-metal plate the bond is non-uniform in character so far as integrity and heat transfer are concerned, with the result that there is a blistering of the veneering sheet and eventually cracking which destroys the value of the corrosion resistant liner.

Another type of prior art multi-metallic plate is that wherein the cladding sheet is united to the base metal plate by spot or row welds at frequent and contiguous points, so frequently arranged as to attempt to carry away sufficient heat to prevent separation. However, plate of this character suffers the disadvantage that with spaced spots or rows experience has demonstrated that there is practically no heat drainage from the liner to the base metal except at the spots of attachment, and hence between spots of attachment the heat flow is laterally or non-radial of the liner in a cylindrical vessel, for instance, and thus a difference in temperature results in a shearing of the spot attachments, and also in a bulging of the cladding or alloy liner such as to cause flexure around each spot of attachment as the temperature changes. Thus there is developed at each of such separated spots of attachment a weakness which is akin to that in a metal sheet which is bent many times. Therefore, due to the constant flexing at these spot weld locations where flexibility abruptly changes to rigidity (in the pressure vessel structure) the shearing and bending effects ultimately result in cracks which destroy the value of the cladding as a liner.

The present invention therefore has as a feature a veneered plate which when incorporated in pressure vessels presents the advantage of having, firstly, adequate radial drainage of heat, and secondly, a resistance weld bonding substantially coextensive with the superimposed areas of the base metal plate and the veneering sheet. Thus there is eliminated the stresses heretofore referred to in reference to that type of plate welded at only such frequent and contiguous spots as provide simply for heat drainage and thus the arrangement of spaced spot welds of the prior structure is replaced with continuity of separately formed spot welds. Also there is secured by this new invention all the advantages of the continuity of that type of pressure forge welded plate without the disadvantage of the non-uniform bond, since the method used in this present invention insures uniform integrity of the parts comprising the composite plate, as will be hereinafter set out.

Still another feature of the invention is the uniting of several superimposed metal plates, even of metals of different physical and metallurgical characteristics by stitch resistance welding under conditions insuring a welded area substantially coextensive with the superimposed surfaces of all of the metal plates with a minimum of current cost, and a rate of welding which results in a veneered plate of relatively low cost.

Also, a salient feature of the invention is the veneering of a base plate when a substantial thickness of veneering is required, with several metal sheets simultaneously welded to the base metal by a method of stitch welding with a continuous contact rolling pressure electrode and with a particular current timing in respect thereto such that there is a physical continuity of pressure between the parts being welded with a discontinuity of electrical input provided by electronic controls of the "thyratron" and "ignitron" type, so that for each weld there is a succession of current "pulses" of different duration, first soaking the metal with heat at the location of the weld and then ultimately heating the metal to the welding condition without substantial injury or impairment of any of its properties.

It has also been discovered and is within this invention that in making a continuity of welds throughout the superimposed area of a plate being veneered it is desirable to cool the plate by submerging the same in a coolant such as water during the welding operations.

With the above and other features in view there will now be described a practical manner in which the invention has been carried out, and in connection with which the following drawings are pertinent.

In the drawings—

Fig. 1 is a view in perspective of a machine by which the method may be carrier into practice;

Fig. 2 is a transverse section of the completed article;

Fig. 3 is a perspective view of the completed article of Fig. 2 deformed by pressure to a required shape which may form one constituent part, for instance, of a completely lined cylindrical pressure vessel.

In detail—

Figure 4:
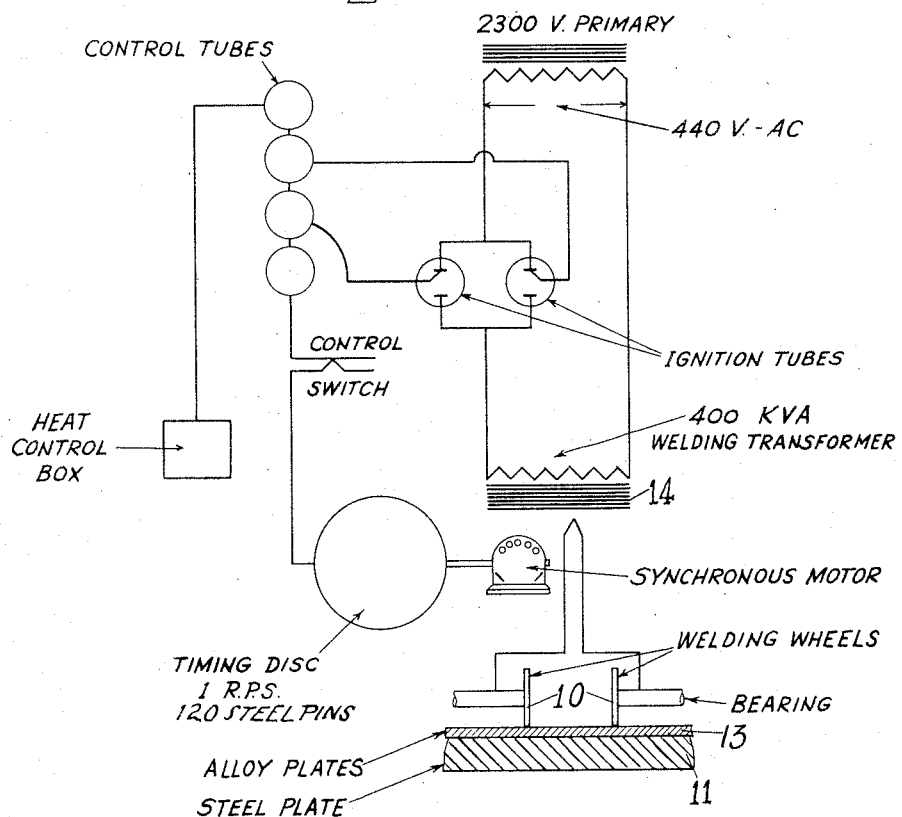
Fig. 4 is a diagrammatic view of the welding circuit and control.

The assembly upon which the present invention has been carried into practice is a modification of a standard large size planer as illustrated in Fig. 1.

The planer bed 1 which travels at constant speed and may be reciprocated at a uniform rate, and of which both speed and rate may be adjusted to requirements, is indicated at 1, the directions of movement being delineated by the double ended arrow. The columns 2 at each side support the vertically adjustable carriage 3 with the traversing heads 4 and 5 adjustable for distance between the heads, and adjustable for cross traverse coincidentally by the usual screw members 6, 7 and 8.

However, the tool holders of the usual planer set up, and carried by the traversing heads 4 and 5 are, in the present instance, replaced by welding heads A and B, each head being of identical construction with the exception of being right and left handed and as a consequence of which only one need be here described.

Each of these welding heads A and B is of the roll seam welding type wherein a double acting infinitely adjustable stroke air cylinder 9 is supplied with air pressure on each side of its piston through air pressure reducing valves and controls, such that variations in pressure of application of a welding electrode roll 10 to the work may be secured and maintained uniform or constant as desired. The welding electrode roll 10 is of suitable copper-alloy material, and is mounted in water cooled bearings.

The work to be operated upon is a base plate 11 which, in the present illustration, is of considerable thickness and is placed in the trough 12 carried by the planer bed 1 and in which it is preferably submerged in a cooling fluid such as water. The upper face of the base plate 11 is cleaned by any suitable procedure and has superimposed thereon a plurality of thin veneering sheets 13 which may be of the same or different kinds of metal and which are to be simultaneously resistance welded together and to the base plate; the superimposed surfaces of the veneering sheets 13 are likewise suitably cleaned down to the bare metal.

Figure 5:
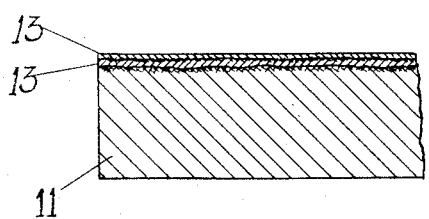
Fig. 5 is a view similar to Fig. 2 showing the intermediate alloy plate as thicker than the thin surface alloy plate.
Figure 6:
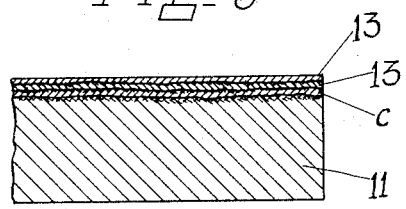
Fig. 6 is a section similar to Fig. 2 showing three layers with the layer adjacent the base metal plate being thicker than each of the other two layers.

The right hand welding head carries a 400 k. v. a., 440 volt welding transformer indicated at 14 in both Figs. 1 and 5. Power is obtained from a 2300 volt power supply brought into the primary of a transformer which reduces it to 440 volts A. C. single phase, one lead of which runs, as shown, directly to the 400 k. v. a. welding transformer 14, while the other lead is connected in series to an 8000 ampere, type SP-8 "Ignitron" power tube assembly and thence to the other side of the 400 k. v. a. welding transformer 14. The "ignitron" power tubes are of the mercury pool cathode type energized by an ignition electrode dipping into a pool of mercury and during any time interval in which the ignition electrode is passing current into the mercury pool, the "ignitron" power tubes are fired to pass current into the main welding circuit. Thus to control the flow of welding current, it is only necessary to govern the periods during which the ignitor fires the mercury pool of the power tubes. Such control is effected by auxiliary grid controlled tubes which, in turn, are controlled by a synchronous motor driven inductive timer consisting of a large disc making one revolution per second and having 120 pins peripherally distributed with equal spacing. As the steel pins pass between the poles of an induction generator the current thus established energizes the grids of the control tubes which, in turn, fire the "ignitron" power tubes, thus the number of cycles of welding current may be varied in any combinations of 120, and therefore the welding heat, that is, the percentage of capacity used, may be controlled by a resistance in the form of a potentiometer in the control circuit adapted to cause a lagging or advancing of the grid potential of the control tubes.

All of the foregoing equipment contributes to the ability, of the precision type of apparatus used, to provide a continuous line of intersecting and separately formed resistance welds through interruption and timing of the current in coordination with welding pressure and rate of linear movement between the work and welding head such that there is a series of current "pulses" that produce an alternate heating and cooling action in the weld metal, thus preventing excessive heat accumulations that might build up were the current permitted to flow continuously. Thus the physical and metallurgical characteristics of the metal are preserved while, at the same time, an economy in current consumption is effected.

In carrying out the present invention, it is important to localize an extremely high current density at the spots, and at the location of contacts of the rollers 10 which are the desired and expected spots at which the welds are to occur; for the veneering sheets 13 there is selected several thin sheets. For instance, if the veneering is to be one-sixteenth inch thick two sheets are selected of one-thirty-second inch thickness, or the intermediate sheet may be thicker and the top sheet thinner, as conditions of welding may require. However, the assembled sheets are in any event more flexible and subject to impression than is the case with a single plate equal to the sum of their thicknesses, and thus with the force applied by the roll electrodes 10 highly localized contact of the several thin sheets 13 with each other and with the base metal 11 at the desired location of a weld is assured without damage to either roll electrode or veneering sheets. This has the advantage stated that good contact for simultaneous welding as between the several sheets and as between the several sheets and the base metal plate is possible, whereas with a single thick sheet of cladding metal excessive pressure is required to deflect and make contact at the desired spot and there consequently may then be contact at other locations and hence the effect of the current would be distributed over such a large area as to be inefficient and reduce the possibility of good welding as well as to increase the cost due to shunt currents. Hence one phase of the present invention involves a plurality of thin veneering sheets so co-ordinated with the welding current that the pressure used together, with the welding current and its control makes it possible to produce the illustrative overlapping spot welding with no damage to either the electrode discs 10 or impairment of the ultimate surface of the veneered plate.

In the making of veneered metal plate difficulty is experienced in integrating the veneering by the stitch resistance weld method when the veneering thickness required is heavy, and in fact certain advantages are apparent in using multiple veneering sheets when the thickness of veneering required to withstand erosion, abrasion, blows, or other detrimental effects, is only one-sixteenth inch. Under certain conditions thick veneering is required, as when solid deposits in the form of carbon or scale are so hard as to require removal by tools which might seriously damage a veneered surface.

Also, certain difficulties are encountered in applying successfully more than a single veneering sheet to build up the thickness for the reason that irregularities in the surface of the initially applied sheet, together with some oxidation, render unsatisfactory the contact between the underlying and overlying sheets with the result that, as heretofore suggested, greater welding pressure and higher current requirements work against economy and also detract from the physical and metallurgical properties of the finished product, and thus the advantages of stitch welding are lost. I have found that an improved product, can be made with the stitch welding method when several veneering alloy sheets 13 of equal or unequal thickness are used. These may be of the same or different metallurgical properties, such as straight chromium steels, nickel-chromium steels, and chromium-molybdenum steels.

For instance, in carrying the invention into practice I have found that I am able to produce a satisfactory veneered plate if I place two chromium alloy steel sheets 13 in superimposed relation on the base metal 11 and then simultaneously weld the two sheets in place. This is accomplished by successively precision indexing the welding rollers 10 for rows of adjacent and intersecting welds over the entire surfaces to be united and with a timing adjusted to constant rate of travel of the planer bed 1 such that the welds in the same row intersect and with welds of subsequent rows so indexed as to also intersect. I have also found that it is desirable to use in veneering plate with two thicknesses of metal, intermittent current "pulses" which are a combination of on, off, on, off, on, and so forth, up to the final weld so that the metal is given a preheating and soaking heat previous to the actual weld.

I have found that it takes more heat to unite the alloy steel to a mild steel carbon base such as 11 than it does to unite the sheets of alloys, and for this reason in performing the weld it is sometimes desirable to either vary the character of the metal of the intermediate layer or to make the intermediate layer of greater thickness in order that the weld may be performed with proper current variations to result in a good product.

A contributing factor is that of course at the time of the weld the intermediate sheet portion being welded is not subject to the same cooling influences as are the upper layers or sheets and hence more heat is retained in the intermediate layer. Another contributing factor to the success of this method over welding thicker veneering sheets is that the welding electrode rolls 10 may be applied with much less pressure due to the fact that a number of thin layers of metal on the application of welding electrode pressure will more readily deflect into welding contact. Thus less welding pressure is required and less current than if a single stiff plate was present, since one layer deflects and causes a deflection of a succeeding layer, and so on, through the several layers.

An analogy is found in writing heavily with a pencil upon a pad of paper where the deflection of the top sheet caused by the pencil point is carried through to several successive illustrative underlying sheets, this principle producing, in the overlying thin veneering sheets, improved conditions for stitch welding as compared with the conditions present when a single heavy sheet is used.

Since the planer bed 1 moves at a constant rate of speed each time current is caused to flow in a series of "pulses" for a single weld by the timing equipment, the electrode rolls 10 thus have moved to a new location and the progress is so timed as to produce a succession of slightly overlapping welds under each electrode roll 10 as the plate makes a single pass under the welding electrodes and the process is, as stated, continued until there is substantially no unwelded area throughout the extent of the plate being operated upon.

As shown in Fig. 5 the welding current passes from one roll welding electrode 10 through the several alloy sheets 13 to the metal base plate 11, out of the base plate 11 through the several alloy sheets 13 and to the other roll welding electrode 10, thus avoiding any heating loss such as occurs if one electrode is contacted with the base metal plate 11.

While in the foregoing I have described my invention with some particularity, it is nevertheless to be understood that in practicing the same I may resort to any and all modifications with respect to materials, manner of procedure, thicknesses of material, and the like, within the scope of the claims which define my invention, and that the components manufactured by my invention are capable of being embodied in containers or pressure vessels subjected to sudden temperature changes without destruction of the integrity of the bond between the base metal and the alloy veneering.

I claim:

1. The method of forming corrosion resistant composite clad metal plate including a thick base plate and a plurality of relatively thin liner sheets of corrosion resistant metal with each liner sheet thin enough to insure the establishment of highly localized pressure and welding current contacts upon the application of localized welding pressure and current to the liner sheets and with the sheets of such a total thickness as to provide adequate corrosion resistance and to afford sufficient mechanical strength to resist the stresses incident to use in industrial pressure vessels, the method including the superimposing of the liner sheets upon the base plate while said sheets are separate and unbonded over at least a major portion of their surfaces, simultaneously applying highly localized pressure to the assembled sheets and plate at a plurality of spaced spots, simultaneously passing through the zones of pressure on one side of the liner sheets an electric current sufficient to weld the sheets and plate to each other, whereby the effective utilization of current flow between said spots is enhanced and shunting therebetween is proportionately diminished, and subsequently repeating such application of pressure and welding current at successive and overlapping spots or weld areas and in successive parallel rows of spots with the welds in successive rows overlapping the welds of adjacent rows and thereby forming complete overall bonds between the sheets and the plate.

2. The method of forming corrosion resistant composite clad metal plate including a thick base plate and a plurality of relatively thin liner sheets of corrosion resistant metal with each liner sheet thin enough to insure the establishment of highly localized pressure and welding current contacts upon the application of localized welding pressure and current to the liner sheets and with the sheets of such a total thickness as to provide adequate corrosion resistance and to afford sufficient mechanical strength to resist the stresses incident to use in industrial pressure vessels, the method including the superimposing of the liner sheets upon the base plate while said sheets are separate and unbonded over at least a major portion of their surfaces, applying highly localized pressure to the assembled sheets and plate, simultaneously passing through the zones of pressure on one side of the liner sheets an electric current sufficient to weld the sheets and plate to each other, whereby the effective utilization of current flow through said zone is enhanced and shunting is proportionately diminished, and subsequently repeating such application of pressure and welding current at successive and overlapping spots or weld areas and in successive parallel rows of spots with the welds in successive rows overlapping the welds of adjacent rows to form complete overall bonds between the sheets and plate.

3. The method of manufacturing corrosion resistant clad plate which includes the disposition of a plurality of thin (of the order of $\frac{3}{64}$" or less) liner sheets of high chromium content steel over a thick base plate of steel, said liner sheets being unbonded over the major parts of the areas of their contiguous or opposing faces subjecting the composite structure to a continuously high pressure at spots contactingly succeeding each other in a straight narrow zone, said pressure forcing the different metallic layers into close contact, simultaneously forming spot welds between the liner sheets and between the base plate and one of the liner sheets by subjecting the pressure receiving spots to high density welding current applied in welding cycles each of which initially involves a plurality of short current impulses and a final longer current impulse which raises the temperature gradient of the composite structure to an extent sufficient to form a complete weld without excessive burning of the liner about the contact point, the current passing through the zones of pressure on one side of the liner sheets, and repeating said operations in successively contacting zones until said metallic laminae are integrally united over substantially all of their effective areas.

4. The method of manufacturing corrosion resistant clad plate which includes the disposition of a plurality of thin (of the order of $\frac{3}{64}$" or less) and separate liner sheets of high chromium content steel over a thick base plate of steel, said sheets being unbonded over the major parts of the areas of their contiguous or opposing surfaces subjecting the composite structure to high pressure at spots contactingly succeeding each other in a straight narrow zone, said pressure forcing the different metallic layers into close contact, simultaneously forming spot welds between the liner sheets and between the base plate and one of the liner sheets by subjecting the pressure receiving spots to high density welding current applied in welding cycles each of which initially involves a plurality of short current impulses and a final longer current impulse which raises the temperature gradient of the composite structure to an extent sufficient to form a complete weld without excessive burning of the liner about the contact points, the current passing through the zones of pressure on one side of the liner sheets each of said welding cycles also including periods of heat transfer from the liner contact surface alternating with the initial current impulses so that at the beginning of the final current impulse the temperature at said surface is less than at the junctions of the different metallic strata, and repeating said operations in parallel and overlapping zones until said metallic laminae are integrally united over substantially all of their contacting areas.

5. The method of manufacturing corrosion resistant clad plate, the method comprising the steps of disposing a plurality of thin liner sheets of corrosion resistant steel over a thick steel base plate, said liner sheets being separate and unbonded over the major parts of their contiguous or opposing faces, and integrally uniting the base plate and said sheets throughout substantially all of their contacting surfaces by a resistance welding process which involves the production of parallel and overlapping rows of welds with the successive welds in each row overlapping, said process also involving welding cycles each of which includes a plurality of short current impulses and alternating periods of cooling of the liner surface sufficient to create such a temperature gradient in the composite plate structure that the exterior surface of the outside liner is considerably below the temperatures of the junctions of the various metallic laminae being welded, the current passing through the zones of welding pressure on one side of the liner sheets, each cycle thereafter involving a final longer current impulse which raises the temperature gradient through the composite structure to a point where a complete weld is made without excessive burning at the liner contact point through which the current is supplied.

6. The method of manufacturing composite clad plate having a laminated metallic veneering of corrosion resistant metal consisting of the steps of disposing a plurality of thin sheets of corrosion resistant metal upon a thick base plate of weldable metal, said sheets being separate and unbonded to each other over at least the major parts of their areas, and then simultaneously integrating said plate and said sheets by forming successively overlapping resistance welds between the plate and its adjacent sheet and between adjacent sheets.

7. The method of manufacturing composite clad plate having a laminated metallic veneering of corrosion-resistant metal consisting of the steps of disposing a plurality of thin sheets of corrosion-resistant metal upon a thick base plate of weldable metal, said sheets being separate and unbonded to each other over at least the major parts of their areas, applying highly localized pressure to the assembled sheets and plate by means of electrodes at a plurality of spaced spots on the outermost of said sheets, simultaneously passing through the zones of pressure an electric current sufficient to weld the plate to the adjacent sheet and weld the sheets to each other, and subsequently repeating such application of pressure and welding current at spots distributed over the area of the outer sheet.

8. The method of manufacturing composite clad plate having a laminated metallic veneering of corrosion-resistant metal consisting of the steps of disposing a plurality of thin sheets of corrosion-resistant metal upon a thick base plate of weldable metal, said sheets being separate and unbonded to each other over at least the major parts of their areas, applying highly localized pressure to the assembled sheets and plate by means of electrodes at a plurality of spaced spots on the outermost of said sheets, simultaneously passing through the zones of pressure an electric current sufficient to weld the plate to the adjacent sheet and weld the sheets to each other, and subsequently repeating such application of pressure and welding current at overlapping spots distributed over the area of said outermost sheet.

OTIS RICHARD CARPENTER.